Nov. 28, 1961 C. W. CURRY 3,010,206
SAFETY HAND SHEARS
Filed Sept. 23, 1960 2 Sheets-Sheet 1

INVENTOR.
CLYDE WILLIAM CURRY
BY Leland R. McCann
George W. Reiber
ATTORNEYS

Nov. 28, 1961　　　　C. W. CURRY　　　　3,010,206
SAFETY HAND SHEARS
Filed Sept. 23, 1960　　　　　　　　　　2 Sheets-Sheet 2
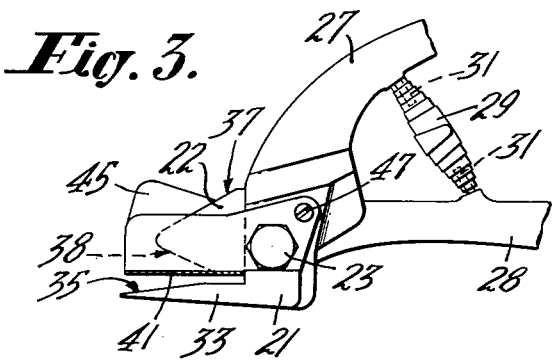
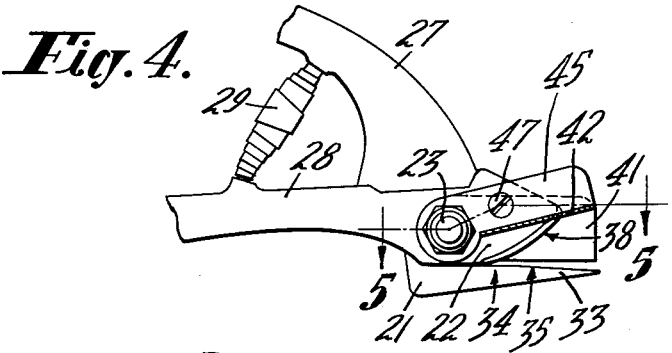
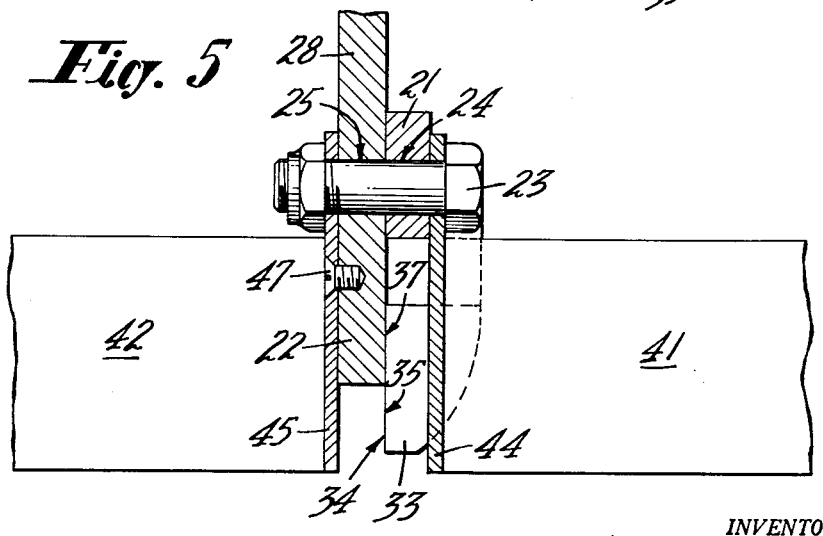
INVENTOR.
CLYDE WILLIAM CURRY
BY Leland R. McCann
George W. Reiber
ATTORNEYS United States Patent Office 3,010,206
Patented Nov. 28, 1961

3,010,206
SAFETY HAND SHEARS
Clyde William Curry, East Hazelcrest, Ill., assignor to American Can Company, New York, N.Y., a corporation of New Jersey
Filed Sept. 23, 1960, Ser. No. 58,037
6 Claims. (Cl. 30—131)

The instant invention relates to safety hand shears for severing metal straps wrapped tightly around packages and the like and has particular reference to novel elements which confine the severed ends of the straps during the severing operation.

While many tools have been devised to cut thin metal straps from packages and the like, it has been found that an operator prefers a light weight hand shears which is easily manipulated and not too cumbersome or heavy. Hand shears however offer no protection to the user. In many instances, the strap is bound around the package so tightly that when it is cut, the severed ends fly upwardly with explosive force sufficient to injure the operator.

It is an object of the instant invention to provide a hand shears which is light weight in construction and which includes wing shields which overlie a substantial portion of the strap to be cut so as to confine the ends of the strap upon severance and thereby protect the operator against injury.

A further object is the provision in such a hand shears of a support which is readily insertable under the strap to be cut and which supports the strap during the severing operation.

Numerous other objects and advantages of the invention will be apparent as it is better understood from the following description, which taken in connection with the acompanying drawings, discloses a preferred embodiment thereof.

Referring to the drawings:

FIG. 3 is an enlarged elevational view of one side of the shears with the handles broken away and a wing shield portion shown in section;

FIG. 4 is a view similar to FIG. 3 showing the opposite side of the shears; and

FIG. 5 is an enlarged sectional view as taken substantially along the broken line 5—5 in FIG. 4.

Figure 1:
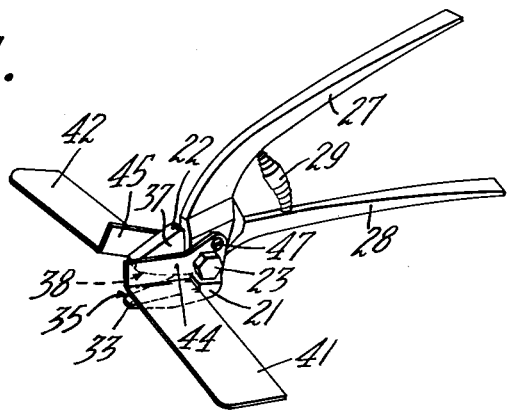
FIGURE 1 is a perspective view of a safety hand shears embodying the instant invention.

As a preferred and exemplary embodiment the drawings disclose the instant invention as applied to a hand shears of the type disclosed in United States Patent 2,648,-901 for cutting a thin sheet metal strap A (FIG. 2) wrapped tightly around a package or the like B.

The hand shears preferably include a pair of shear blades comprising a lower shear blade 21 and an upper shear blade 22 pivotally secured together by a common pivot pin or bolt 23 which extends through close fitting bores 24, 25 formed in the respective shear blades (see FIG. 5). Beyond the pivot pin 23 the shear blades 21, 22 are formed with actuating handles 27, 28 respectively. A compression spring 29 interposed between the handles 27, 28 yieldably keep the handles and the blades in an open position for use. Short pins 31 (FIG. 3) in the handles retain the compression spring 29 in position against displacement.

Figure 2:
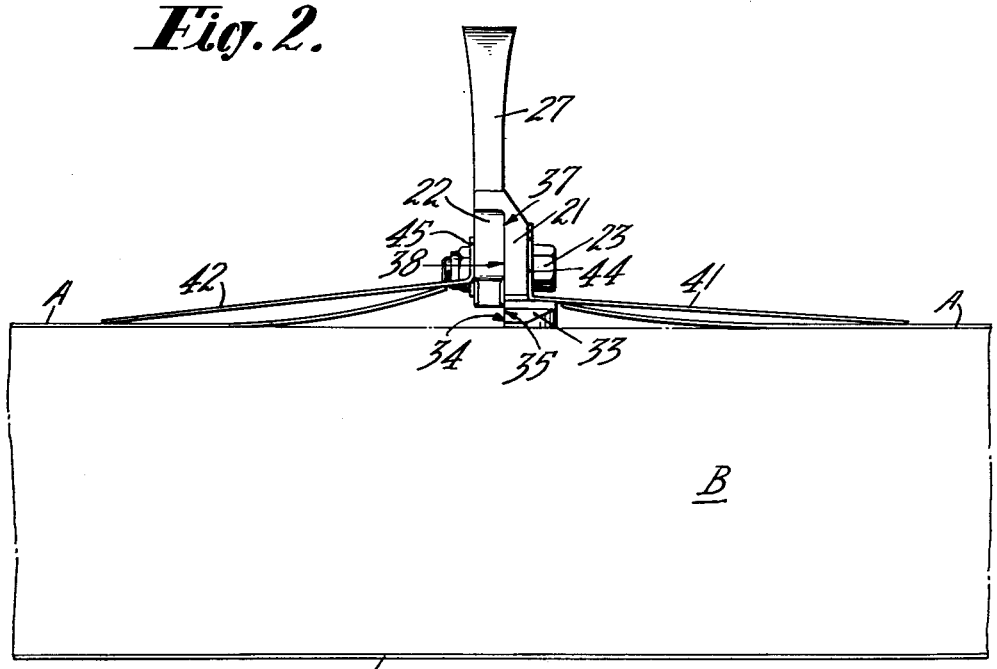
FIG. 2 is an enlarged front view of the shears in the operation of cutting a strap wrapped around a package, the view showing the severed strap and a portion of the package.

The lower shear blade 21 preferably is formed with a relatively broad wedge shaped, flat top foot or support member 33 which due to its wedge shape is readily insertable under a strap A as shown in FIG. 2. An inner vertical face 34 of the blade 21 and the support member 33 is ground flat to provide a sharp strap cutting edge 35.

The upper shear blade 22 preferably is formed with an inner flat ground face 37 which is disposed against the flat face 34 of the lower shear blade 21 and which terminates in a sharp curved and beveled strap cutting edge 38 for cooperation with the lower sheer blade cutting edge 35 in cutting or severing a strap A interposed between them.

In the operation of severing a strap A on a package B, the flat wedge shaped support member 33 is pushed under the strap as shown in FIG. 2 so as to position the strap between the shear blades 21, 22 and to support the strap in a flat relation. The handles 27, 28 are then squeezed together in a one hand manipulation as with a pair of pliers and this action pivots the shear blades 21, 22 against opposite sides of the strap A and with a shearing action severs the strap to release it from the packages.

In order to prevent the severed ends of the strap A from flying upward and injuring the operator through the inherent spring or tension in the strap, the hand shears are provided with elongated wing shields 41, 42 which are disposed above the support member 33 in spaced relation thereto and which project laterally in opposite directions beyond the support member so as to overlie and cover the strap A for a considerable distance on each side of the support member as best shown in FIG. 2.

Although the wing shields 41, 42 may be made integral and secured to any part of the shears adjacent the blades 21, 22, they preferably are made as separate members of generally rectangular configuration and formed at their inner ends with angularly disposed bracket members 44, 45 respectively. The bracket members 44, 45 are mounted on the pivot pin 23 as shown in FIG. 5 adjacent the outer face of their respective shear blades 21, 22 and are secured by screws 47 to the shear blades for pivotal movement therewith. The inner end of the wing shield 41 adjacent its mounting bracket 44 paritally overlaps the strap support member 33 as shown in FIG. 5 and is spaced above the support member 33 a distance slightly greater than the thickness of the strap A so as to provide a clearance for the strap and to closely confine the strap to hold it in a flat condition during the severing operation to facilitate clean cutting of the strap.

The inner end of the opposite wing shield 42 adjacent its mounting bracket 45 is located so as to be slightly above the level of the inner end of the wing shield 41 at the termination of the strap cutting operation, i.e. when the shear blades 21, 22 are closed, as shown in FIG. 2 so as to not interfere with the cutting of the strap.

The wing shields 41, 42 preferably slope downwardly and outwardly so that their terminal ends contact the strap A to be severed, at a remote location from the shearing blades 21, 22 as shown in FIG. 2 to confine the end portions of the strap against upward explosive movement when the strap is severed by the blades.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A safety hand shears for severing metal straps wrapped tightly around a package, comprising a pair of sharp cooperating shear blades, a handle attached to each of said blades, a common pivot for said blades, a support disposed adjacent the lower of said blades for insertion under said strap to support said strap during severance, and elongated wing shields disposed above said support in spaced relation thereto and projecting laterally in opposite directions beyond said support so as to overlie and cover said strap for a considerable distance on each side of said support to confine the ends of said strap against upward explosive movement when said strap is severed.

2. A safety hand shears of the character defined in claim 1 wherein said wing shields extend from said shear blades.

3. A safety hand shears of the character defined in claim 1 wherein said wing shields are secured to said shear blades and are movable with said blades.

4. A safety hand shears of the character defined in claim 1 wherein one of said wing shields is fixed relative to said support in a predetermined spaced relation thereabove and setting off between said shield and said support a clearance opening slightly greater in height than the thickness of said strap for the reception of said strap in a confined relation to facilitate severance of said strap.

5. A safety hand shears of the character defined in claim 1 wherein said wing shields are of elongated rectangular formation, and wherein one end of each of said shields is formed with a substantially normally disposed bracket member, and wherein said bracket members are mounted on said common pivot adjacent said shear blades and secured against movement relative to their respective blades.

6. A safety hand shears of the character defined in claim 1 wherein the outer terminal ends of said wing shields are formed to remotely engage against said strap during the severing operation to hold said strap against upward movement.

No references cited.